United States Patent

[11] 3,595,155

[72] Inventors Rolf Noack
Dresden;
Johannes Weise, Dresden; Wolfgang
Krause, Gorlitz, all of, Germany
[21] Appl. No. 761,224
[22] Filed Sept. 20, 1968
[45] Patented July 27, 1971
[73] Assignee Veb Pentacon Dresden Kamera-und
Kinowerke
Dresden, Germany

[54] SINGLE REFLEX CAMERA WITH
INTERCHANGEABLE OBJECTIVE LENS HAVING
SPRING DIAPHRAGM AUXILLIARY SHUTTER
AND FLASH LIGHT SWITCH OPERABLE BY THE
CAMERA SHUTTER RELEASE
3 Claims, 3 Drawing Figs.

[52] U.S. Cl. .................................................. 95/64,
95/63
[51] Int. Cl. .................................................. G03b 9/02
[50] Field of Search .................................. 95/63, 59,
58, 53, 64 C

[56] References Cited
UNITED STATES PATENTS
2,362,547 11/1944 Fuerst .......................... 95/63
3,203,331 8/1965 Hofmann ..................... 95/63

Primary Examiner—Samuel S. Matthews
Assistant Examiner—Richard L. Moses
Attorney—Young and Thompson ABSTRACT: A single lens reflex camera having a shutter mechanism operated by a shutter release is provided with an interchangeable lens housing. The lens housing includes an objective lens, an auxiliary shutter and a switch which when closed connects a source of supply voltage to a flash light, a drive ring on the lens housing is urged in one direction by a first spring means and when released from a cocked position actuates the auxiliary shutter and the switch. A spring diaphragm in the housing is urged to a fully open position by a spring and a release means in the housing engages the camera shutter, when the lens housing is connected to the camera, to release the drive ring from a cocked position to initiate an exposure and to permit the spring diaphragm to change from a fully open position to a preset working aperture for flashlight exposure before the auxiliary shutter opens.

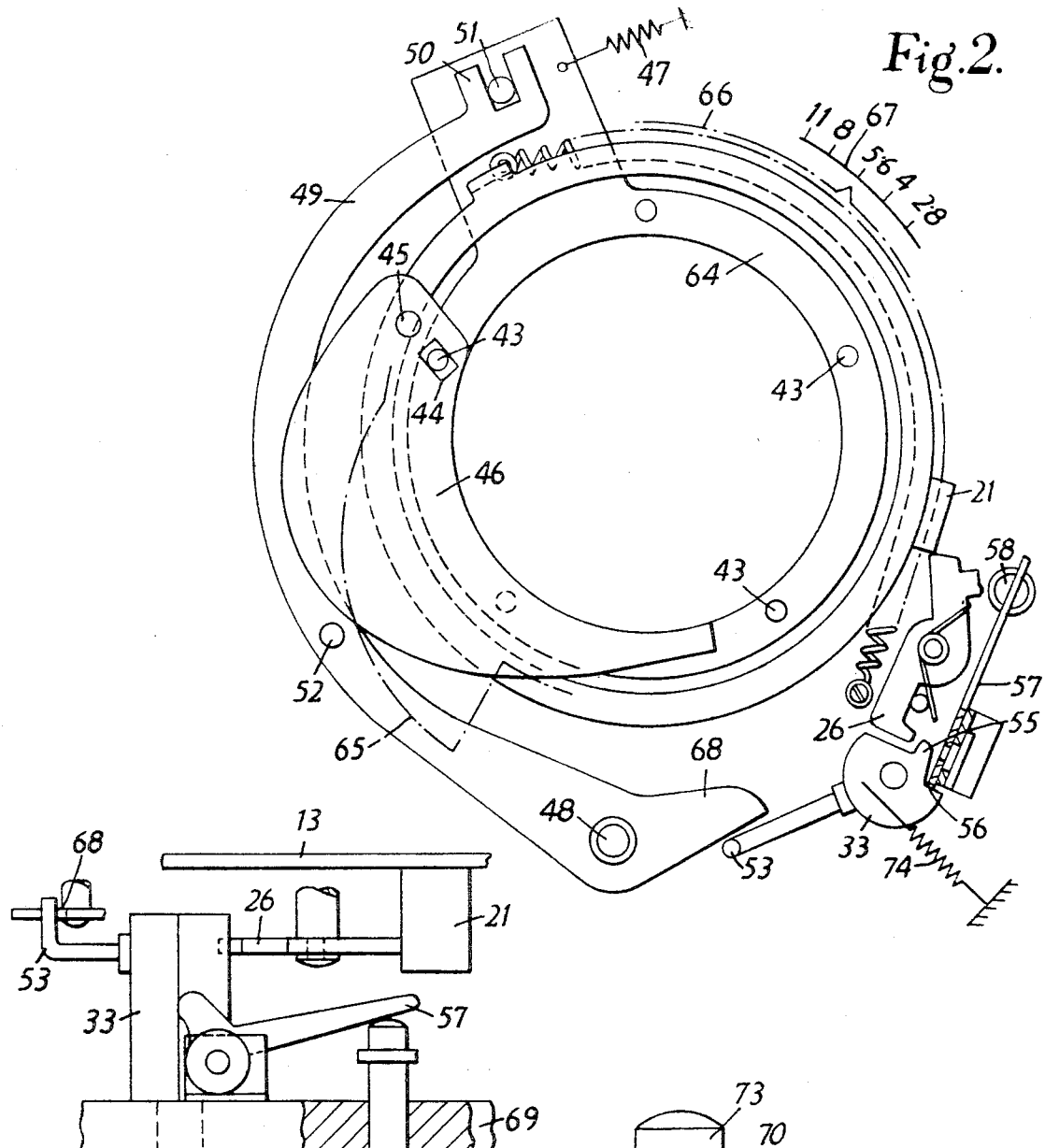

3,595,155

SINGLE REFLEX CAMERA WITH INTERCHANGEABLE OBJECTIVE LENS HAVING SPRING DIAPHRAGM AUXILLIARY SHUTTER AND FLASH LIGHT SWITCH OPERABLE BY THE CAMERA SHUTTER RELEASE

BACKGROUND OF THE INVENTION

The invention relates to an interchangeable objective lens with built-in diaphragm and a rotary shutter which comprises an ignition device for the execution of flash exposures.

In known objectives lenses of this kind operating levers for the built-in rotary shutters are coupleable with the camera release through so-called multiple releases so that in this way a common actuation of the rotary shutter and of the camera release can take place. The diaphragms provided on the other hand are movable exclusively by diaphragm setting members on the lens, which do not permit closing of the diaphragm out of the open position into the working position necessary for the exposure conditions in each case.

These objective lenses are therefore inconvenient for use with single lens reflex cameras as the subject is dark in the case of flash exposure and the image in the viewfinder must either be viewed with full aperture which has to be reset before operation of the shutter, or viewed with reduced intensity at an aperture set for accurate exposure. In single lens reflex camera, preset diaphragms are known per se which are movable out of the open position into the working position in dependence upon the actuation of the camera release. These preset diaphragms are coupleable with the camera mechanism through transmission members which, when such a preset diaphragm is installed in the objective lens of the initially-mentioned kind, make the gear connection between the objective lens and the camera mechanism expensive and complicated as a result of the coupling members which are also necessary for the rotary shutter.

The problem of the invention is in the installation of a preset diaphragm in an interchangeable objective lens with rotary shutter, to provide for flash ignition and connection of the preset diaphragm and of the rotary shutter with the camera mechanism. The invention has the purpose of adapting interchangeable objective lenses with rotary shutters equipped for flash lighting to the requirements of single lens reflex cameras.

SUMMARY OF THE INVENTION

According to the invention there is provided in a single lens reflex camera having a housing including a shutter mechanism operable by a shutter release, an interchangeable lens housing including an objective lens mounted in the housing, an auxiliary shutter mounted in the housing, switch means mounted on the housing adapted to connected a source of supply voltage to a flash light, a drive ring mounted on the housing and urged in one direction by a first spring means and adapted to actuate the auxiliary shutter and the switch means, a spring diaphragm mounted in the housing and urged towards a fully open position by a second spring means and a release means mounted on the housing adapted to release the drive ring from a cocked position to initiate an exposure and to permit the spring diaphragm to change from a fully open position to a preset working aperture for flash light exposure before the auxiliary shutter opens, whereby when the lens housing is connected to the camera housing, the release means engages the shutter release and actuation of the shutter release operates the release means. The interchangeable lens housing may be provided with a catch tab on the drive ring engageable with a catch lever mounted on the housing, which catch lever is engaged by the release means to release the drive ring. The release means may be urged in one direction by the action of engagement with the catch tab and the shutter release may be urged toward an inoperative position by a stronger spring whereby the effect of the release spring is overcome until the shutter release is actuated.

BRIEF DESCRIPTION OF DRAWING

FIG. 2 shows the built-in preset diaphragm and, FIG. 3 shows the gear connection between objective lens and camera mechanism.

DESCRIPTION OF PREFERRED EMBODIMENT

Figure 1:
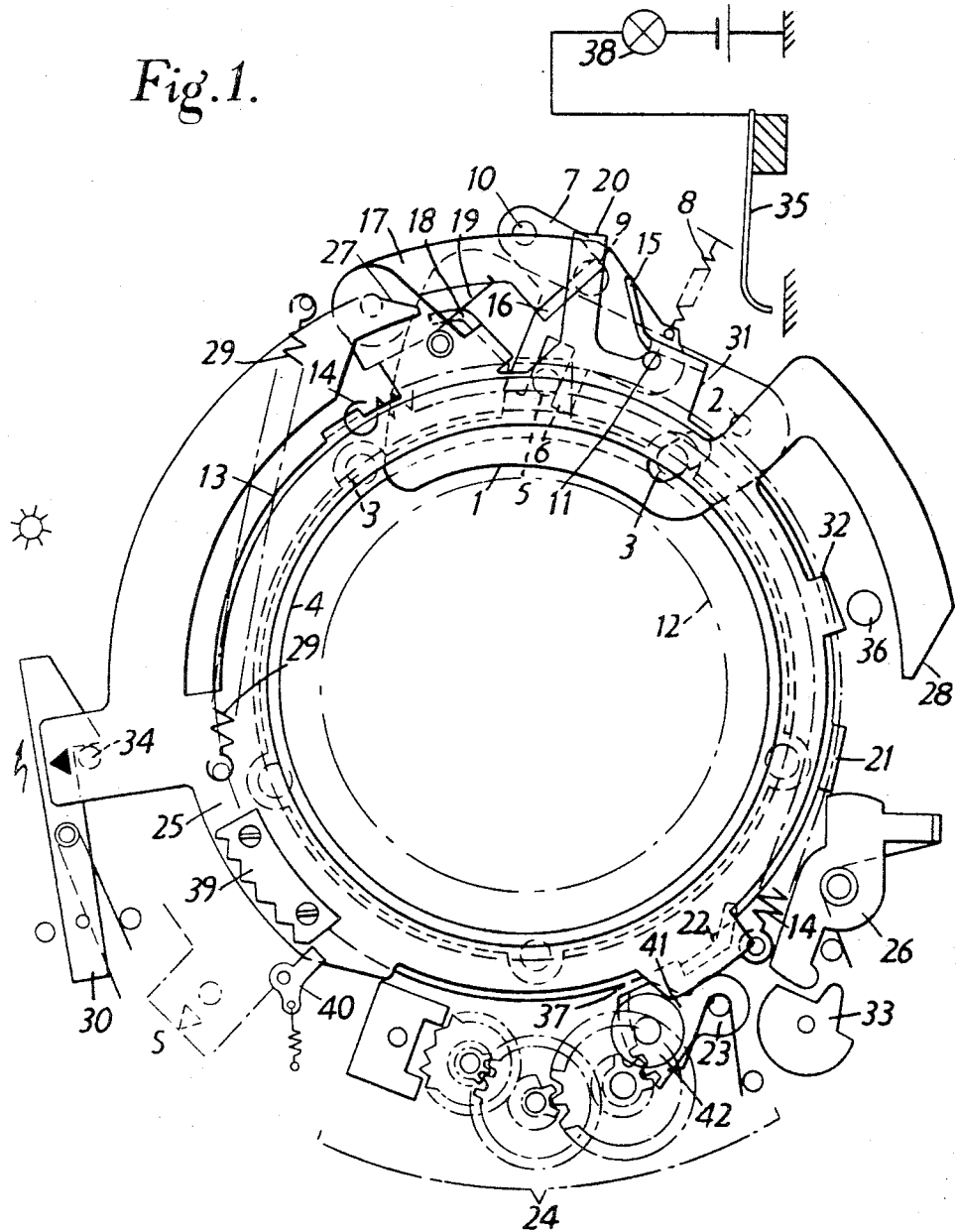
FIG. 1 shows the rotary shutter with flash ignition device installed in an objective lens.

In a lens housing 69 (not shown in detail the shutter blades 1, of which only one is illustrated for the sake of simplicity, are rotatably mounted for rotation about nondisplaceable mounting journals 2. Rotation pins 3 engaging in slots of the shutter blades 1 are arranged on a blade drive ring 4 which is mounted for rotation concentrically about light passage aperture 12. The blade drive ring 4 further possesses a drive pin 5 which is engaged by a drive fork 6 of the drive lever 7. A closer spring 8 anchored in the shutter housing is connected with the drive lever 7 and seeks to draw the latter in a counterclockwise direction into the position corresponding to the closed position of the shutter blades 1. The drive lever 7 is rotatable about a spindle 9 and carries an opening pin 10 and a transmission pin 11.

The drive ring 13, which the drive spring 14 urges in the clockwise direction, is rotatably mounted coaxially with the blade drive ring 4. An angled rigid opening tab 15, a rotatable opening lever 17 carrying the opening cam 16, and an angled rigid closing tab 18 are provided on the drive ring 13 in the path of the transmission pin 11; a looped spring 19 seeks constantly to place the opening lever 17 against the stop tab 20 also arranged on the drive ring 13. Furthermore, the drive ring 13 possesses a angled catch tab 21 and an escapement dog 22. A catch lever 26 is pivotably arranged in the running-off path of the detent tab 21 while brake nose 41 of a toothed segment 23 of a gear escapement 24 is mounted in the running-off path of the escapement dog 22. In the running-off path of the stop tab 20 there lies a switch 35 which serves to close an ignition current circuit for a connected flash bulb 38.

Also concentrically with the blade drive ring 4 a setting ring 25 is rotatably mounted which comprises a opening dog 27 in the path of the opening pin 10 and an operating dog 28 for the catch lever 26. The catch lever 26 can also be brought out of engagement with the drive ring 13 by rotation in the counterclockwise direction by the diaphragm release 33 coupled with the camera release. A return spring 29 seeks to rotate the setting ring 25 constantly in the clockwise direction; the setting ring 25 is retainable by a blocking lever 30 in a middle "flash" position against this return spring 29. In the running-off path of abutment arm 31 of the drive ring 13 the setting ring 35 carries an abutment dog 32. Furthermore a diaphragm setting ring 64 (see FIG. 2), which carries drive pins 43, is rotatably mounted in the lens housing. The drive pins 43 engage in slots 44 of diaphragm blades 46 which are pivotable about a spindle 45. To the diaphragm setting ring 64 there is hooked a setting spring 47 which seeks to rotate the diaphragm blades 46 into the position corresponding to the smallest diaphragm aperture. Furthermore, on the diaphragm setting ring 64 a coupling pin 51 is provided which is coupled through setting fork 50 with a setting lever 49. The setting lever 49 is pivotable about a mounting journal 48 and carries a setting pin 52 opposite to which the setting cam 65 of a diaphragm setting member 66 is arranged. The diaphragm setting member 66 is adjustable according to the value set on a diaphragm scale 67. A release arm 53 of the diaphragm release 33 engages on the arm 68 of the setting lever 49. The catch lever 26 for the catch tab 21 of the drive ring 13 is arranged in the path of release nose 55.

A flank 56 of the diaphragm release 33 bears on a double lever 57 which is in connection with release bolt 58 (see FIG. 3). The release bolt 58 penetrates the back of the lens housing 69 where it is coupleable with an operating lever 71 mounted in camera housing 70. The operating lever 71 is subject to the action of a return spring 72 and communicates with camera release 73.

The manner of operation of the device is as follows:

When the lens housing 69 is attached to the camera housing 70 the release bolt 58 strikes against the operating lever 71 on the camera. As a result of the return spring 72 the release bolt 58 is pressed in so that the double lever 57 is rotated in the counterclockwise direction (see FIGURE 3) and the diaphragm release 33 is rotated in the clockwise direction (see FIGURE 2). The release arm 53 abuts the setting arm 68 of the setting lever 49 and rotates the latter in the counterclockwise direction about the mounting journal 48. The diaphragm setting ring 64 is rotated by the setting fork 50, through the coupling pin 51, against the setting spring 47, as the force of the return spring 72 for the camera release 73 is greater than the force of the setting spring 47. In this action the diaphragm blades 46 rotate about the spindles 45 into the position corresponding to the maximum diaphragm aperture.

On rotation of the diaphragm release 33 in the clockwise direction the catch lever 26 can follow the release nose 55 and place itself into the path of the catch tab 21 of the drive ring 13.

The presetting of the diaphragm aperture takes place according to the diaphragm scale 67, the setting cam 65 being set in relation to the setting pin 52 of the setting lever 49. After the cocking of the drive ring 13 the shutter mechanism is in the readiness position, the catch lever 26 preventing undesired running-off of the shutter mechanism, by grasping the catch tab 21.

On depression of the camera release 73 the operating lever 71 is pivoted against the return spring 72 and the diaphragm release 33 is rotated in the counterclockwise direction as a result of the release spring 74. The release nose 55 then brings the catch lever 26 out of engagement with the catch tab 21 and the release arm 53 departs from the setting arm 68. Consequently the setting spring 47 can rotate the diaphragm setting ring 64 and the setting lever 49 coupled with it in the clockwise direction. This movement ends as soon as the setting pin 52 reaches the setting cam 65. Since the drive ring 13 is released, it can run off under the action of the drive spring 14. Firstly the opening tab 15 departs from the transmission pin 11, so that the closer spring 8 can rotate the drive lever 7 into the position corresponding to the closed position of the shutter blades 1. While the focal plane shutter of known construction on the camera, set to a long time exposure, thereupon opens, the escapement dog 22 of the drive ring 13 strikes upon the toothed segment 23, whereby further running-off of the drive ring 13 is delayed. This delay is so large that the focal plane shutter on the camera can open completely before the opening cam 16 of the drive ring 13 reaches the transmission pin 11 and opens the rotary shutter on the lens.

As soon as the escapement dog 22 has overcome the escapement 24 the drive ring 13 runs off further without hindrance. As the opening lever 17 bears upon the stop tab 20, the opening cam 16 strikes upon the transmission pin 11 and rotates the drive lever 7 in the clockwise direction so that the shutter blades 1 come into the open position necessary for the photographic exposure. On reaching this open position of the shutter blades 1 the switch 35 is actuated by the stop tab 20 of the drive ring 13 and thus the ignition circuit for the flash bulb 38 is closed. As soon as the opening cam 16 has left the transmission pin 11 the closer spring 8 with support by the closer cam 18 rotates the drive lever 7 into the closed position again. At the end of this exposure operation, carried out by running-off of the drive ring 13, the drive ring 13 is halted by striking of its stop arm 31 on the stop dog 32 of the setting ring 25 held fast by the blocking lever 30. In this position of the drive ring 13 the transmission pin 11 lies on the closer cam 18, so that inter alia, undesired rebounding is prevented from causing subsequent opening of the shutter blades 1 when rotated into the closed position.

In the removal of the lens housing 69 from the camera housing 70 the setting spring 47 and the release spring 74 are relaxed. The release lever 33 is rotated in the counterclockwise direction into the rest position so that the catch lever 26 is brought out of engagement with the catch tab 21. On removal of the lens housing 69 thus the shutter mechanism is also uncocked.

What we claim is:

1. In a single lens reflex camera having a housing including a shutter mechanism operable by a shutter release mounted on the camera lens housing the provision of an interchangeable lens housing including an objective lens mounted in the housing, an auxiliary shutter mounted in the housing, switch means mounted on the lens housing adapted to connect a source of supply voltage to a flash light, a drive ring mounted on the lens housing and urged in one direction by a first spring means and adapted to actuate the auxiliary shutter and the switch means, a spring diaphragm mounted in the lens housing and urged towards a fully open position by a second spring means and a release means mounted on the lens housing adapted to release the drive ring from the cocked position to initiate an exposure and to permit the spring diaphragm to change from a fully open position to a preset working aperture for flash light exposure before the auxiliary shutter opens, whereby when the lens housing is connected to the camera housing, the release means engages the shutter release and actuation of the shutter release operates the release means.

2. In a camera according to claim 1 the provision of a catch tab on the drive ring engageable with a catch lever mounted on the lens housing, which catch lever is engaged by the release means to release the drive ring.

3. In a camera according to claim 2 wherein the release means is urged in one direction by the action of a release spring whereby the catch lever is pivoted out of engagement with the catch tab, and the shutter release is urged towards an inoperative position by a stronger spring whereby the effect of the release spring is overcome until the shutter release is actuated.